July 15, 1952 J. A. M. PUIG 2,603,210
COLLAPSIBLE LIQUID COLUMN MANOMETER
Filed March 19, 1951 3 Sheets-Sheet 1
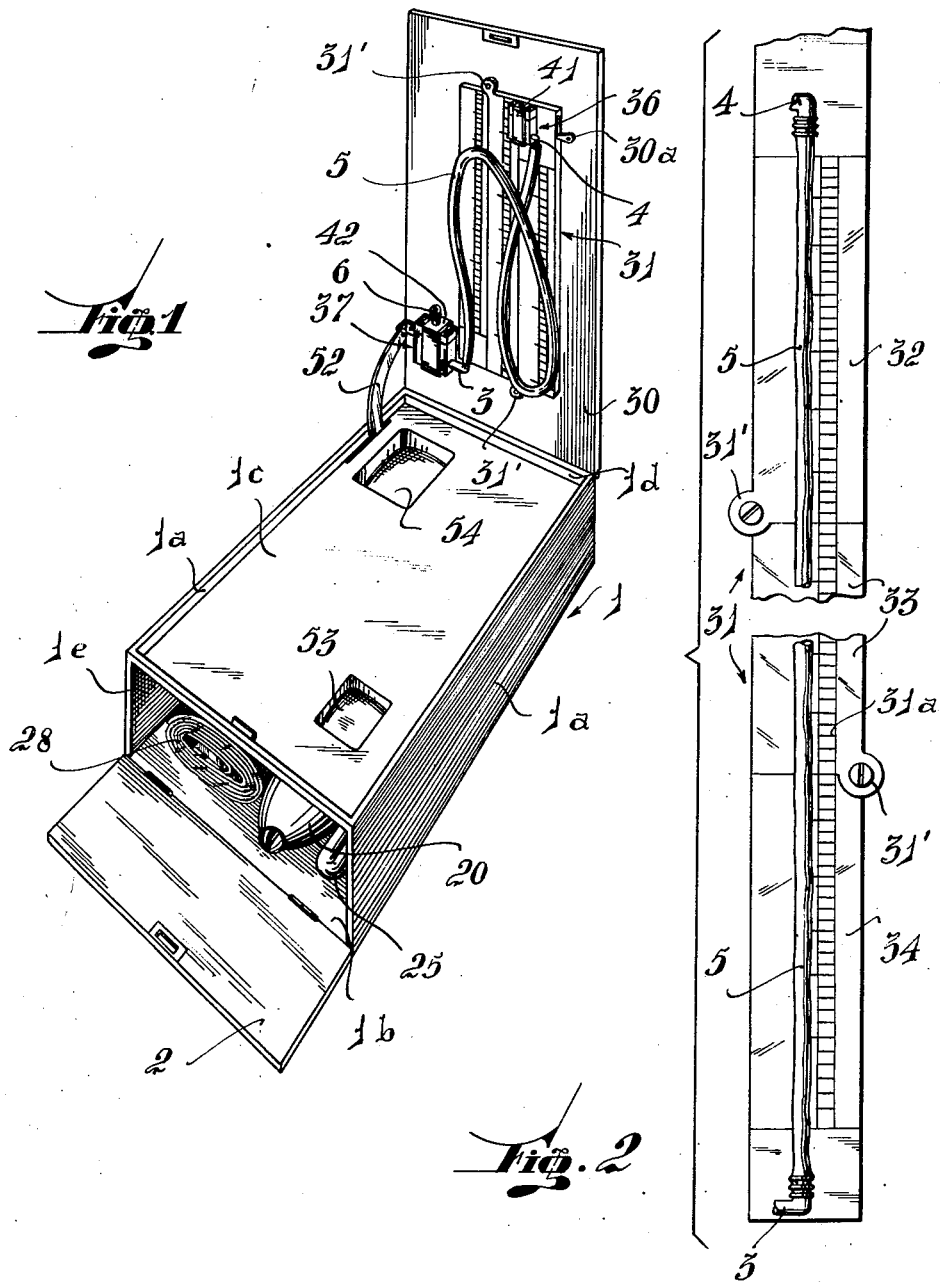

July 15, 1952 J. A. M. PUIG 2,603,210
COLLAPSIBLE LIQUID COLUMN MANOMETER
Filed March 19, 1951 3 Sheets-Sheet 2

INVENTOR,
Jorge A. Millet Puig
BY Ivan P. Tashof,
Attorney

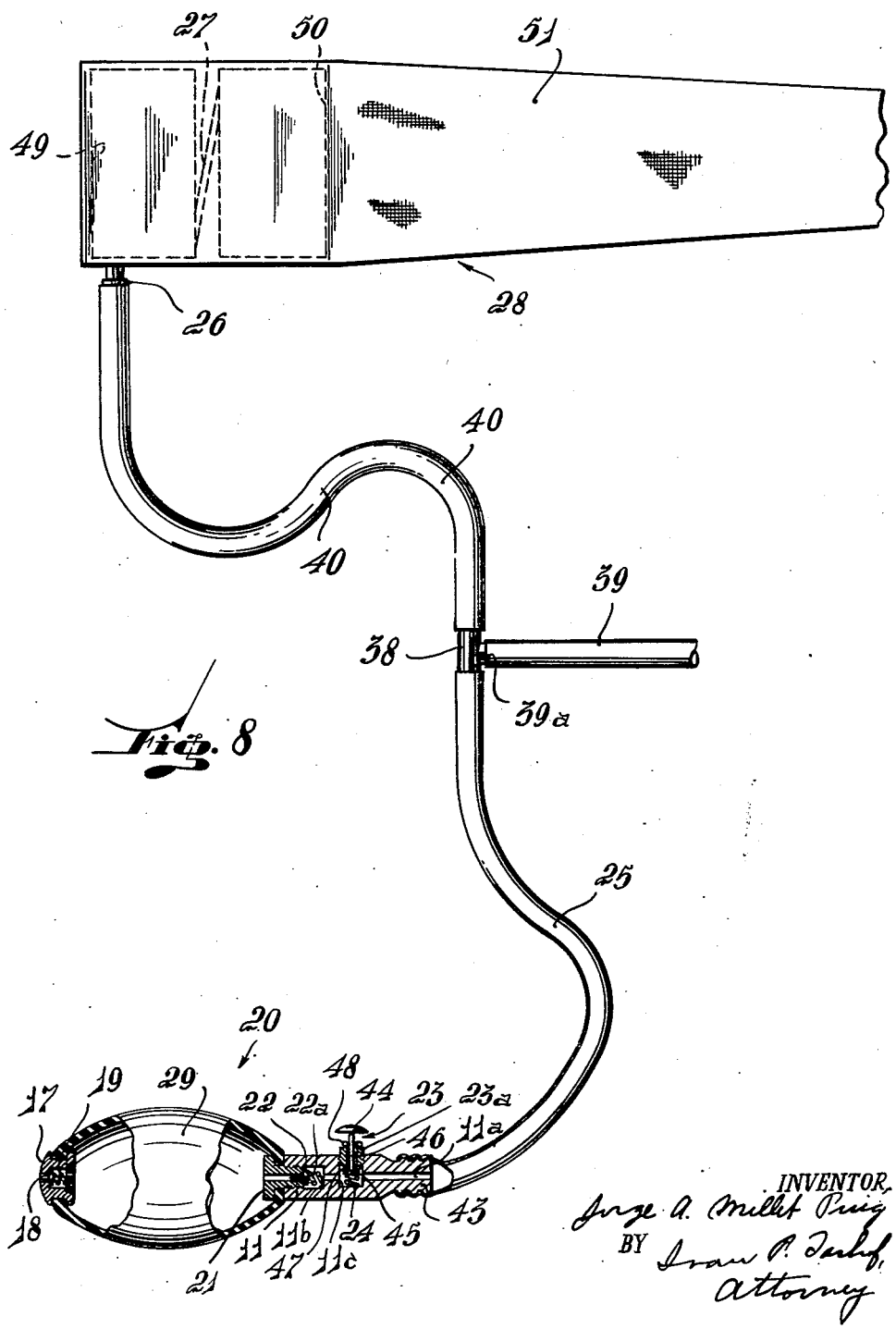

Patented July 15, 1952

2,603,210

UNITED STATES PATENT OFFICE 2,603,210

COLLAPSIBLE LIQUID COLUMN MANOMETER

Jorge A. Millet Puig, Buenos Aires, Argentina

Application March 19, 1951, Serial No. 216,355

4 Claims. (Cl. 128—2.05)

The present invention relates to pressure measuring instruments, and more particularly to manometers of the type including a column of liquid such as mercury as the pressure indicating instrumentality. More particularly still, though not exclusively, my invention relates to sphygmomanometers of the liquid column type.

Broadly speaking, for the measurement of arterial blood pressure, two types of manometer have heretofore been proposed and are at present in use, namely the anaeroid type and the mercury column type. The last-named type may be divided into an open sub-type operating with a column of mercury open to the atmosphere, and a closed sub-type, operating with a column of mercury closed to the atmosphere. All three varieties have their respective advantages but have also their respective drawbacks.

The anaeroid sphygmomanometer comprises a curved, relatively flexible tube closed to atmosphere and so arranged that any increase in pressure of the fluid which fills it, will tend to straighten said tube. In operation, said tube is, therefore, subjected to alternating stresses and this fact tends to fatigue the material relatively rapidly, whereby the pointer indications fail to represent the true state of affairs. In practice this involves relatively frequent recalibration and certainly constant checking of the instrument.

The mercury column type, on the other hand, while being free from the above described objections, requires a long tube, which makes the instrument very cumbersome and bulky to transport. Furthermore, the open column sub-type has the drawback that, apart from the possible danger of spilling of mercury occurring at the open end of the tube, the fact that the mercury is continuously in contact with the atmospheric air, leads to contamination of the metal and the formation of a dirty meniscus, and hence to uncertain readings.

In the closed column sub-type, such contamination is, of course avoided, but there is a loss of sensitivity owing to a very much closed up scale, and, what is still more serious, the readings are apt to be erratic owing to the influence of atmospheric conditions of pressure and temperature, on the air between the meniscus and the closed end of the tube, which air must be compressed by the mercury column when rising during use, as will be clear to those skilled in the art.

Somewhat similar objections may be urged against certain manometer tubes currently used in the field of engineering as for measuring exhaust and supercharger pressures in diesel engines. Such tubes are of U shape and have to be of considerable length and bore, thus, rendering them extremely bulky for transport. In addition, of course, the other general objections to the open tube and closed tube types of manometer are applicable in the engineering models also, even though for many purposes, industrial instruments are designed to give zero readings (balanced arm types), so that they are used without a scale properly so called.

Other objections against known sphygmomanometers, are that they require two rubber tube connections to be made to the unitary rubber bag which is intended to be placed about the patient's arm and to be inflated, the pressure thus produced being communicated to the mercury column; and that, for the relief of such pressure, a tap or similar type of valve device is employed. Such taps are not easy to operate quickly and accurately, but such operation is necessary if accurate readings are to be taken, since, as is well known, the instrument is used by checking the flow of blood in an artery by means of the inflation of the bag, whereby the mercury column is raised by the increase in the internal pressure of the instrument, and then relieving said pressure until blood flow just starts again, the value of the pressure at that time being read off on the scale against the mercury column. Any difficulty, therefore, in the manipulation of the relief device, must lead to uncertainty in the readings.

It is therefore a principal object of the present invention to provide a novel liquid column manometer which shall overcome substantially all of the drawbacks of the known types of liquid column manometer, shall be highly sensitive and accurate, while being compactible to a convenient bulk for transport.

A further object of the invention is to provide a liquid column assembly for manometers, of a novel construction embodying a flexible tube for the liquid and means for establishing communication between said liquid column, the atmosphere and the source of the pressure to be investigated.

Another object of the invention is to provide a mercury type sphygmomanometer which while embodying a substantially closed column, shall nevertheless, have the advantages of the open column while at the same time being free from contamination and danger of spilling inherent in the open tube variety.

A further object of the invention is to provide a mercury type sphygmomanometer comprising a two part inflatable pressure pad.

A further object of the invention is to provide a mercury type sphygmomanometer comprising an inflatable pressure pad structure having a single external tube connection.

A still further object of the invention is to provide a mercury type sphygmomanometer having improved pressure relief valve means.

These and other objects and advantages of the present invention will become more clearly apparent in the course of the following detailed description of a preferred embodiment thereof which, by way of example, has been illustrated in the accompanying drawings.

In the drawings:

Fig. 1 is a perspective view of my novel mercury sphygmomanometer in partly open position.

Fig. 2 is a front elevation of the scale of the instrument, shown in extended position, with a portion of the central part broken away.

Fig. 8 is a part sectional plan view of the pressure pad assembly showing the tube connections and the air bulb.

Figure 3:
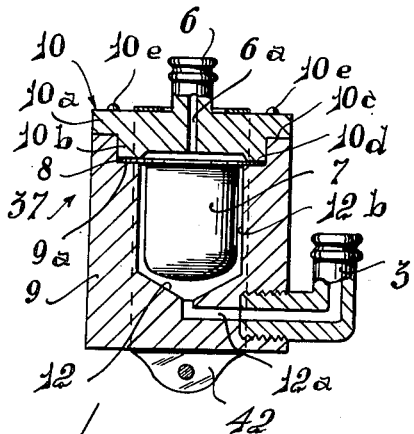
Figs. 3, 4 and 5 are respectively a vertical sectional view, an end elevation and a plan view of a well member for the foot of the mercury column.

Referring first to Fig. 1, the instrument as there shown, comprises a box like container 1, having side walls 1a, a bottom wall 1b, a sunken top wall 1c and a rear wall 1d defining a storage chamber 1e, adapted to be closed when the instrument is not in use, as by a front closure flap 2. The sunken top 1c has diagonally opposed padded or cloth-lined recesses 53, 54 for a purpose to be hereinafter made clear.

The container 1 also comprises a lid 30 hinged to the rear wall 1d, and likewise connected to one or both side walls 1a as by stop link 52 the purpose of which is to hold said lid securely in raised position with respect to said container 1.

Mounted on said lid 30 and on the face thereof adjacent the top wall 1c when in closed position, is the mercury column assembly which comprises upper and lower receptacles 36 and 37 respectively, a tubular member 5 connecting said receptacles and a scale member 31. The receptacles 36 and 37 are of generally substantially similar construction, differing practically only in this that the lower receptacle 37 includes an upper nipple as well as a lateral nipple whereas the upper receptacle 36 may dispense with said upper nipple although the presence of such a nipple would not materially interfere with the proper operation of the upper receptacle. For convenience and clearness the lower receptacle 37 will hereinafter be called a well member and the upper receptacle 36 will be denominated an air chamber.

Continuing now the more detailed description of the mercury column assembly the foldable scale member 31 (see also Fig. 2) which, as shown, includes end members 32 and 34 and a middle member 33, the end member 32 being connected to one corner of the middle member 33 and the end member 34 being connected to the diagonally opposite corner of the middle member 33 by hinges 31' so that the member 32 may be swung to lie adjacent one edge of member 33 and the member 33 may be swung so as to lie adjacent an edge of member 34, when in collapsed position. The scale member 31 has on it suitably calibrated scale markings 31a, which extend along all three of members 32, 33 and 34, as shown in Fig. 2. One of the end members, for example the end member 34, of the scale member 31, is fixedly mounted on the lid 30, the other two members 33 and 32 being free as regards the lid and being supported only by the hinge members 31'.

In the collapsed position, the scale member is held together on the lid 30 as by a pivoted finger 30a.

Adjacent the non-hinged end of the fixed scale end member 34, the lid 30 has mounted on it as by a strap 42 a well member 37 and the other end member 32 has mounted as by a strap 41 on the free end thereof, an air chamber 36. The well member 37 and the air chamber 36 are best seen in Figs. 3 to 6.

Figure 4:
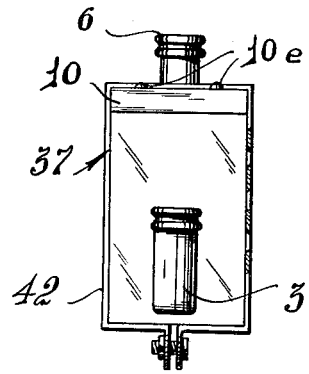
Figure 5:
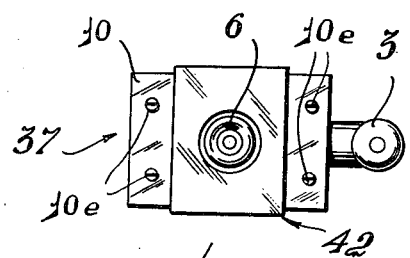

Referring, therefore, more particularly to Figs. 3 to 5, the well member 37 comprises a body portion 9 and a stepped end closure cap 10 having a peripheral flange 10a and a spigot portion 10b defining a shoulder 10c. The spigot portion 10b is preferably centrally recessed to provide an annular end face 10d. On the side of the end closure cap 10 remote from spigot 10b is a nipple 6 axially perforated to provide a passage 6a communicating with the interior of the well member in the assembled condition of the parts.

The body portion 9 is hollowed out to provide a well 12 the lowest point of which communicates by means of a duct 12a with a nipple member 3, which projects laterally from the body member 9 and is preferably removable and of the elbow type as shown. The end of the body portion 9 remote from the duct 12a is stepped to receive the spigot portion 10b of the end closure portion 10, which spigot portion 10b is of larger diameter than the well 12. The stepping of the body portion 9 provides an annular shoulder 9a between which and said end face 10d is clamped a flange 8 of a bag 7 of air impervious flexible material such as rubber, which bag, in undistended condition is of smaller volume than the well 12, whereby a well space 12b is defined within the body member 9 when the parts are in assembled condition. The end closure member 10 may be secured to the body member 9, in any convenient manner so as to provide a gastight joint at the meeting of the shoulder 9a the flange 8 and the end face 10d. As shown, it is secured by screws 10e.

Figure 6:
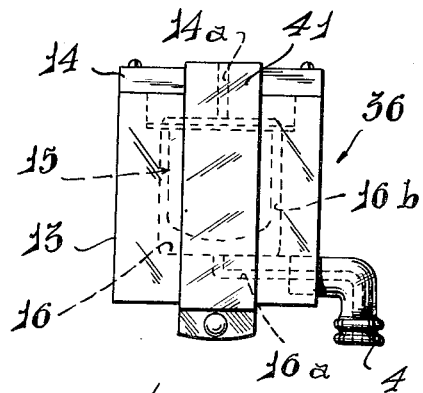
Fig. 6 is a side elevation of an air chamber for the top of the mercury column.

The air chamber 36, as shown in Fig. 6, is generally similar in construction to the well member 37, and comprises a body member 13 and end closure member 14, a chamber 16 in said body member, and communicating by a duct 16a with a nipple 4, and a gas impervious, flexible bag 15 defining a chamber space 16b inside the body member 13. In the case of the air chamber 36 however, the end closure member 14 although perforated to provide a passage 14a, does not require to be fitted with an external nipple.

Figure 7:
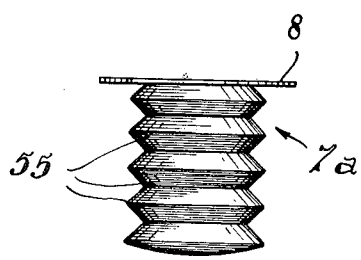
Fig. 7 is a side elevation of a preferred construction of an air bag for the well member of Fig. 3 and the air chamber of Fig. 6.

In Fig. 7 I have shown a form of bag which can be used in either or both of the well member 37 or the air chamber 36 when great sensitivity is desired.

The modified bag 7a has constructions 55 thereby giving it a bellows configuration which facilitates collapse of the bag and greatly increases the surface area exposed to the fluid pressures as will hereinafter be made clear.

As already stated, the well member 37 and the air chamber 36 are mounted on the lid and an end portion of the scale member, respectively, and when so mounted, the well space 12b is connected to the chamber space 16b by means of a non-opaque flexible tubular connector 5 (see Fig. 1) which may be made of translucent or transparent rubber or synthetic material, and should be of a length to extend, without excessive sag, between the well and the air chamber when the scale member 31 is in extended position.

When the instrument is in use the upper nipple 6 of the well 37 has coupled to it one end (not shown) of a flexible tube 39 (see Fig. 8), the other end 39a of which is connected as by a T coupling 38 to two portions 25 and 40 of an air tube. The portion 40 has its end remote from the T coupling connected to the nipple 26 of a pad 28, and the portion 25 has its end remote from the T coupling connected to the delivery nose 43 of a manually operable bulb type air pump 20 which is valved so that compression of the bulb 29 forces air along tubes 25, 39 and 40 to the well member 37 and the pad 28 respectively, and release of the bulb 29 will draw in air from atmosphere as through a suitable nonreturn valve 17 having a valve member 18 urged by a spring 19 as is well known in the art.

By this arrangement only one external connection 26 is required for the pad 28. Said pad, in the improved form according to the present invention comprises two inflatable members 49, 50 connected together, internally of the pad as by a tube 27, whereby the bulk of the pad is considerably reduced as compared with conventional unitary pads and furthermore the pad may be more readily and conveniently applied to a patient's arm. The pad 28 also includes a winding strip 51 which may be an extension of a cloth or the like backing for the portions 49, 50.

The manual air pump 20 is also modified according to the present invention as regards the air control means. When the manometer is used, as will be more particularly explained hereinbelow, the bulb 29 is alternately compressed and released to drive air along tube 25 until a suitable pressure has been created in the bag 7 of the well member 37 and, when employed as a sphygmomanometer, in the pad 28. It then becomes necessary to release the pressure but under fairly close control. In conventional manual air pumps, a tap type release means is provided, which in practice is too cumbersome to operate if quick action becomes necessary and if accurate readings are desired.

In the novel modification shown in Fig. 8 the air pump 20 is provided with a delivery nozzle 11 bored axially to provide an air passage 11a and being externally ribbed or roughened at the outlet end thereof to provide a good gripping surface for insertion in a rubber tube such as tube 25.

The delivery nozzle 11 has at the end thereof remote from the roughened end a recess 11b in axial alinement with the passage 11a, said recess being screw threaded at its outer extremity to receive a bored connection plug 21, and adjacent the inner end thereof forming a valve chamber in which is installed a valve member 22 normally urged to close the bore in said plug 21 as by a compression spring 22a.

Delivering nozzle 11 has likewise a lateral recess 11c normally closed by a release valve assembly 23 comprising a screw plug 23a through which extends a valve stem 46. On the outside of said plug 23a the valve stem 46 has an enlarged head 44 and the plug 23a is provided with a cushioning member 48 consisting for example of a washer preferably toroidal in shape, made of resilient material such as rubber.

Inside said recess 11c the valve stem 46 has a valve head 45 normally urged as by a compression spring 24 against a resilient washer 47 to secure an airtight closure.

As already indicated the bulb 29 has at the end thereof remote from the delivery nozzle 20 a conventional nonreturn air inlet valve 17, 18 and 19.

When the novel manometer of the present invention is used for industrial or engineering purposes, the upper nipple 6 of the well member 37 is connected to the source of pressure to be investigated and the well member 37 and air chamber 36 are conveniently mounted on any suitable supports so that the flexible tube 5 hangs down between them as a U tube. To this end it is advisable that the elbow nozzle 3 of well member 37 be turned down so as to prevent kinking of the tube 5. It is to be understood that for such investigations the scale member 31 will not be required so that the air chamber 36 and the well member 37 will not be attached to such scale member or to the lid of the box in which they may be housed for transport.

When the manometer is embodied as a sphygmomanometer as shown in the drawings, and a blood pressure reading has to be made, the lid 30 is raised into the upright position shown in Fig. 1, thereby lifting the well member 37 and the air chamber 36 form recesses 54 and 53 respectively in which they are housed when the box is closed, the scale portions 33 and 32 are swung about their hinges into vertical alinement with portion 34 the end closure 2 is opened and the pad 28 air pump 20 and connecting tubes 25, 39, 40 with the T connector 38 (of which only the tube 25 can be seen in Fig. 1) are taken out of the storage chamber 1e in which they are housed when not in use. The pad 28 is then bound about the patient's arm, the nipple 26 is connected to the tube 40 and the tube 39 is connected to the upper nipple 6 of well member 37.

The bulb 29 is then operated in the usual manner to inject air into the tube 25 from which the air passes into the two halves 49, 50 of pad 28 through tube 40 nipple 26 pad portion 49 tube 27 and pad portion 50, to inflate the pad and compress an artery. A part of the air also passes into the bag 7 of well member 37, through T connector 38, tube 39 and nipple 6.

It is to be understood that the well chamber 12b and the tube 5 contain a quantity of a suitable liquid such as mercury, sufficient to give an adequate column of liquid when the tube 5 is in extended position along the scale member 31.

Pressure exerted by the air pumped into the bag 7 is communicated to the liquid column by the distension of the bag which acts as a diaphragm, and causes the liquid to rise in the tube 5 thereby exerting pressure on the volume of gas vapor contained between the meniscus and the bag 15 of air chamber 36. Said bag 15 like bag 7 acts as a diaphragm to displace air contained therein out through passage 41 to atmosphere.

Hence it will be clear that although the indicating medium namely the column of liquid and the gas and vapor immediately above it is enclosed and out of direct contact with the atmosphere, and therefore provides the advantages of the closed tube and variety of instrument, said measuring medium is nevertheless in such communication with the pressure air and the atmosphere, through the bags or diaphragms 7 and 15 that the assembly acts as an open tube variety instrument having also all the advantages of the latter without sharing any of the drawbacks of either type. Moreover, since the bags 7 and 15 are very readily deformable, being suspended in a slack manner instead of being stretched tightly like a conventional diaphragm, there is a minimum of interference with the free motion of the fluids. It is for this reason that a particularly responsive bag like that shown in Fig. 7 is preferred when high accuracy is desired.

As is usual in using sphygmomanometers, the pad 28 is inflated by operation of air pump 20 until the pressure generated therein compresses an artery sufficiently to stop the flow of blood therethrough. Generally the compression is carried on a little beyond the value just necessary to stop circulation and it is the preferred practice to take a reading of the pressure obtaining when the flow of blood is again allowed to start in the artery. This restarting is achieved by gradually releasing the pressure by allowing air to escape from the pad and hence also, owing to the connection in common of the pad and the well member, from the well member 37. Release of the air is obtained by operating a relief valve associated with the air pump. In the improved form according to the present invention of such relief valve, the operator may readily release air with a high degree of sensitivity and with a minimum of trouble by merely depressing the valve button 44, instead of having to turn a tap, which generally will be rather stiff to operate, and therefore is not suitable by its construction for very delicate manipulation such as is required to release minute fractions of air at a time.

I claim:

1. A collapsible liquid column manometer comprising a column of liquid, a well member for storing a portion of said liquid, a first connection means on said well member for connecting the well member to a source of pressure to be investigated, a second connection means on said well member, an air chamber, a coupling means on said air chamber, and a flexible non opaque tubular member extending between said second connection means and said coupling means providing a support for said liquid column contained therein.

2. A collapsible liquid column sphygmomanometer comprising an artery compression pad, manual air pump means for providing pressure air, a manometer assembly including a well member, a foldable scale member, an air chamber mounted on one end of said scale member, fixing means for securing the other end of said scale member adjacent said well member, a flexible non-opaque tubular member extending between and mutually communicating said well member and said air chamber, a tubular connection for connecting said air pump means to said pad, and a tubular branch for connecting said tubular connection to said well member.

3. A collapsible liquid column sphygmomanometer, comprising an artery compression pad, manual air pump means for providing pressure air, a monometer assembly including a foldable scale member, an air chamber mounted on one end of said scale member, a well member, fixing means for securing said well member in adjacent relationship to the other end of the scale member, said air chamber and said well member each comprising a hollow body member, a closure member, a resilient distensible bag-like means secured to said body member by said closure member in gas tight relationship and extending into the interior of said body member, a first passage in said body member communicating with the interior thereof on one side of said bag-like means, a second passage in said closure member communicating with the interior of said body member on the other side of said bag-like means, a flexible non-opaque tubular member connecting said first passage of said well member with said first passage of said air chamber, and a liquid in the interior of the body member of said well member on the same side of said bag-like member as said first passage, a main tubular connection extending from said air pump means to said pad and a branch tubular connection extending from said main tubular connection to said second passage of said well member, the second passage of said air chamber being open to atmosphere.

4. A collapsible liquid column type sphygmomanometer, comprising a box-like container including side walls, a bottom wall, a sunken top wall, a rear wall and a front closure flap, said walls and flap defining a storage chamber, a lid hinged to said container, a liquid column assembly mounted on said lid to face said sunken top wall, said assembly comprising a foldable scale member having one end secured to said lid, an air chamber mounted on the other end of said scale, a well member mounted on said lid adjacent said one end of said scale, said air chamber and said well member each comprising a hollow body member, a closure member, a resilient distensible bag-like means secured to said body member by said closure member in gas tight relationship and extending into the interior of said body member, a first passage in said body member communicating with the interior thereof on one side of said bag-like means, a second passage in said closure member communicating with the interior of said body member on the other side of said bag-like means, a flexible non-opaque tubular member connecting said first passage of said well member with said first passage of said air chamber and a liquid in the interior of the body member of said well member on the same side of said bag-like member as said first passage, manually operable air pump means, an artery compression pad, and flexible tubular connection means for connecting said air pump means to said pad and to said second passage of said well member, said air pump means, said pad and said connection means being of a size to be housed in said storage chamber during transport.

JORGE A. MILLET PUIG.

REFERENCES CITED

The following references are of record in the file of this patent:

UNITED STATES PATENTS

| Number | Name | Date |
|---|---|---|
| 1,225,395 | Beachler | May 8, 1917 |
| 1,900,286 | Huber et al. | Mar. 7, 1933 |
| 2,272,381 | Marvin | Feb. 10, 1942 |

FOREIGN PATENTS

| Number | Country | Date |
|---|---|---|
| 551,084 | France | Mar. 27, 1923 |